United States Patent [19]
Fisher et al.

[11] Patent Number: 5,149,734
[45] Date of Patent: Sep. 22, 1992

[54] HIGHLY FILLED THERMOPLASTIC POLYESTER MOLDING COMPOSITIONS

[75] Inventors: Robert A. Fisher, Wadesville; Keith N. Gray, Newburgh; Lawrence R. Wallace, Evansville, all of Ind.

[73] Assignee: General Electric Company, Pittsfield, Mass.

[21] Appl. No.: 424,749

[22] Filed: Oct. 20, 1989

[51] Int. Cl.$^5$ .................................................. C08K 3/30
[52] U.S. Cl. ..................................... 524/423; 524/436; 524/537; 524/505
[58] Field of Search .................. 524/423, 436, 539, 505

[56] References Cited

U.S. PATENT DOCUMENTS

| | | | |
|---|---|---|---|
| 3,764,576 | 10/1973 | Russo | 260/40 R |
| 3,953,394 | 4/1976 | Fox et al. | 260/40 R |
| 4,043,971 | 8/1977 | Wurmb et al. | 260/40 R |
| 4,351,758 | 9/1982 | Lu et al. | 524/227 |
| 4,444,931 | 4/1984 | Lu et al. | 524/227 |
| 4,780,402 | 10/1988 | Remmington | 430/533 |

FOREIGN PATENT DOCUMENTS 230252 11/1985 German Democratic Rep. .
60-231763 11/1985 Japan .
62-252460 11/1987 Japan .

OTHER PUBLICATIONS

Computer Search Report.
Bulletin No. KR-1084L, (1985), Kenrich Petrochemicals, Inc.
Abstract of JP-60-231763.

*Primary Examiner*—Paul R. Michl
*Assistant Examiner*—Edward Cain
*Attorney, Agent, or Firm*—James V. Costigan

[57] ABSTRACT

A novel compositions is disclosed which comprises polybutylene terephthalate, polyethylene terephthalate, and 30–85% by total weight of barium sulfate of said molding composition.

9 Claims, No Drawings

HIGHLY FILLED THERMOPLASTIC POLYESTER MOLDING COMPOSITIONS

BACKGROUND OF THE INVENTION

Compositions which contain polybutylene terephthalate and barium sulfate have been described in U.S. Pat. No. 4,043,971. These compositions were characterized as having improved tracking resistance as compared to polybutylene terephthalate that did not contain any filler when measured in a standard test. The amounts of filler which are taught in U.S. Pat. No. 4,043,971 are from 5-60% by total weight of composition. This patent also notes additives and stabilizers may be present in the improved tracking resistant compositions but no embodiments of these components are exemplified. Compositions of polybutylene terephthalate and polyethylene terephthalate with fillers are disclosed in U.S. Pat. No. 3,953,394.

The surface of a composition which consists of polybutylene terephthalate and 60%, by total weight of composition, of barium sulfate is not particularly glossy due to the high level of filler and is undesirable for use in preparing molded articles such as tableware which require a smooth surface. The applicants have discovered that if polyethylene terephthalate is added to the composition of polybutylene terephthalate and barium sulfate, the tracking resistance degrades but the surface properties improve. In addition to having a smooth and glossy surface, objects molded from these compositions which contain high levels of barium sulfate have a ceramic-like feel and appearance because of the smooth, glossy surface and the density of the composition which is greater than 2.0. This composition has special utility for the injection molding of articles such as tableware including dishes, bowls or mugs; billiard balls, poker chips, paper weights, wall or floor tiles and the like. These articles have superior stain resistance and are opaque to x-rays.

Compositions within the scope of the invention will pass an FDA extractables test when prepared with a suitable grade of barium sulfate such as barium sulfate, U.S.P.

The compositions of the invention may be used to mold circuit boards or panels. The molded articles are essentially warp free, have excellent creep resistance, a low coefficient of thermal expansion and a high heat distortion temperature.

Barium sulfate is non-toxic and insoluble in dilute acids which make it uniquely suitable for containers which will come in contact with acid foods. Other inorganic fillers such as zinc oxide, titanium dioxide, calcium carbonate are either soluble in dilute acid or will react with dilute acid which makes these materials unsuitable for direct contact with certain food stuffs. For those applications, a resin rich surface is required. Barium sulfate is readily available in highly pure form and is unaffected by conventional microwave cooking.

Accordingly, it is an object of this invention to provide a molding composition which contains high levels of barium sulfate which when molded will have a smooth and glossy surface.

It is also an object of this invention to provide novel molding compositions which have a ceramic-like feel and density.

It is also an object of this invention to provide novel molding compositions which have a special utility for molded articles such as tableware.

It is also an object of this invention to provide a novel molding composition which can be fabricated into objects that are not affected by microwaves and are thus suitable for use during microwave cooking. These and other objects will become apparent from the present specification.

SUMMARY OF THE INVENTION

The present invention is concerned with a composition of a polybutylene terephthalate resin, a polyethylene terephthalate resin and from 30-85% by total weight of said molding composition of barium sulfate.

DETAILED DESCRIPTION OF THE INVENTION

The polybutylene terephthalate resin may comprise from 5-65% by total weight of composition; the polyethylene terephthalate may comprise from 5-65% by total weight of composition and from 30-85% by weight of barium sulfate by total weight of composition.

The preferred polybutylene terephthalate will have an intrinsic viscosity of about 0.78 dl/g as measured in a 60:40 mixture of phenol and tetrachloroethane at 25° C., but polybutylene terephthalate with an intrinsic viscosity of 0.4-1.5 dl/g as measured under the stated conditions may be used. The term polybutylene terephthalate includes branched polybutylene terephthalate which includes branching agents. See for example U.S. Pat. Nos. 3,953,404; 4,788,251 and 4,141,882, which are incorporated by reference. The preferred polyethylene terephthalate will have an intrinsic viscosity of about 0.55 dl/g as measured in a 60:40 mixture of phenol and tetrachloroethane at 25° C., but polyethylene terephthalate having an intrinsic viscosity of about 0.3-1.1 dl/g as measured under the stated conditions may be employed. Polyethylene terephthalate copolymers containing diethylene glycol, cyclohexyl dimethanol, isophthalic acid and the like may be used. The molecular weight of the resin component is not critical and resins of varying molecular weight may be employed depending on the particular end use.

The barium sulfate may be in the form of the naturally occurring barytes or as synthetically derived barium sulfate using well known synthetic techniques.

The particle size may vary from 0.05 to 50 microns, preferably from 1 to 15 microns and most preferably 8 microns. In most applications, the barium sulfate will represent 100% of the total filler present, but in other applications such as those where FDA certification is not required, up to 50% by weight of the total barium sulfate content may be replaced with an inorganic filler and preferably about 15% by weight such as alumina, amorphous silica, anhydrous aluminum silicates, barium ferrite, calcium carbonate, zinc oxide, mica, feldspar, clays such as kaolin, magnesium oxide, magnesium silicate, nepheline syenite, talc, phenolic resins, glass microspheres, wollastonite, titanium dioxide, zirconium oxide, ground quartz, and the like.

The molding compositions of the invention may include polybutylene terephthalate, polyethylene terephthalate and 30-85%; 50-75%; or most preferably 62-70% barium sulfate by weight based on the total weight of said molding composition. Preferred compositions include 15-30% by total weight of composition of polybutylene terephthalate; 8-25% by total weight of composition of polyethylene terephthalate; from 62-70% by total weight of composition of barium sulfate; from 0.0 to 5% by total weight of composition of an external lubricant or more preferably 0.01 to 2.5%; and from 0.01 to 0.5% by total weight of composition of a phenolic antioxidant.

The preferred compositions have a density above 2.0 and preferably above 2.3.

Generally, a weight ratio of 0.2:1 to 5:1 of polybutylene terephthalate to polyethylene terephthalate is preferred, although other ratios may be employed depending on the end use of the composition.

The external lubricants function as mold release agents and the particular material is not critical. The external lubricants may be used at a level of 0.01%-5%; preferably 0.1-0.5% by weight of total composition and will include compounds having a long non-polar backbone such as a carbon chain of 12-60 carbons. Examples include fatty acids; various esters including fatty esters, wax esters, glycerol esters, glycol esters, fatty alcohol esters, fatty alcohols, fatty amides, metallic stearates; and waxes. These materials are described in Modern Plastics Encyclopedia, 1988 Edition, p. 162, which is incorporated by reference.

The additive pentaerythritol tetrastearate is a dispersing agent for the barium sulfate in the base resin and will also function as an external lubricant or mold release agent.

Suitable antioxidants may be included in the composition. These antioxidants include phosphites, hindered phenols, secondary amines and the like, which may be added in effective amounts to retard oxidative degradation. The preferred antioxidant is tetrakis(methylene-3(3',5'-di-tertbutyl-4-butyl-4-hydroxyphenyl)propionate)methane.

Flame retardants may be added in effective amounts for molding articles such as wastepaper baskets which should be flame retardant. Suitable flame retardant agents are disclosed in U.S. Pat. Nos. 4,786,692; 3,334,154 and 4,020,124.

Other additive polymers which are compatible with the polybutylene terephthalate and/or polyethylene terephthalate resins may be added to the blend of polybutylene terephthalate and polyethylene terephthalate in amounts which are less than 50% by weight of the total amount of polybutylene terephthalate and polyethylene terephthalate. These polymers may be utilized as single additive or as multiple additives at levels which are compatible with the composition of polybutylene terephthalate, polyethylene terephthalate and barium sulfate. Generally, it will be preferred to limit the amount of the additive to less than 30% by weight of the total weight of polybutylene terephthalate and polyethylene terephthalate and most preferably about 10% by weight of the total weight of polybutylene terephthalate and polyethylene terephthalate. Suitable additive polymer resins include polycyclohexyl terephthalate and copolymers thereof; polyolefins such as high density polyethylene, (d=above 0.94) low density polyethylene (d=about 0.92) linear low density polyethylene (d=0.916-0.940) or polypropylene; EPDM; ethylene-vinyl acetate copolymers; EEA; polystyrene; high impact polystyrenes; polyetherimides and copolymers thereof, polyetherimide esters, polyarylates; polycarbonates; polyether sulfone, polyphenylene sulfide; polyamideimides; polyether ketone; polyetherether ketone; modified polyphenylene ethers; nylons; engineering TPEs; olefin TPEs and polyurethane TPEs; elastomeric alloy TPEs; acrylics; methacrylics; thermoplastic elastomerics such as AB block copolymers; olefin modified SAN; ABS; SAN, SMA, ASA and the like. These materials are well known and are described in Modern Plastics Encyclopedia, 1988 Edition, pp. 1-124, which are incorporated by reference. The polyetherimide esters are described in U.S. Pat. No. 4,544,734 and the polyether imides are disclosed in U.S. Pat. No. 4,510,289; ASA polymers are disclosed in U.S. Pat. No. 3,944,631, all of which are incorporated by reference.

The composition may be prepared by tumble blending the powdered components, extruding the blend, chopping the extrudate and thereafter fabricating the composition using conventional procedures such as injection molding, blow molding, thermoforming and the like.

It is preferred to use a devolatilizing extruder although other types of mixing equipment may be employed.

When molding the composition of the invention, the surface properties can be optimized by increasing the mold or melt temperature, e.g. mold temperature of 120° F.-240° F. and melt temperature from 510° F-545° F. The molecular weight of particular polymers may require different temperatures for optimum surface properties.

If desired, fiberglass reinforcing fillers may be added as well as pigments, ultraviolet stabilizers, impact modifiers, metal additives for electromagnetic radiation shielding such as nickel coated graphite fibers, antistatic agents, coupling agents such as amino silanes and the like.

If a fiberglass reinforcing filler is used, a level of 1-45% by weight of total composition may be used or more preferably 5-15%.

Materials suitable for use as impact modifiers include SBR, AB and ABA block copolymers such as Kraton and Kraton-G; styrene-butadiene modified acrylics; acrylic modifiers such as EXL 2330; core shell acrylics such as EXL 2691; EVA and EEA polymers. These and other impact modifiers are described in U.S. Pat. Nos. 4,034,013; 4,096,202 and 4,180,494 and in Modern Plastics Encyclopedia; 1988 Edition, p. 160, which are incorporated by reference. Effective amounts range from 1-20% by total weight of composition.

DESCRIPTION OF THE PREFERRED EMBODIMENTS

EXAMPLE 1

Compositions having the following components were prepared by tumble blending the components, extrusion through a 2½" diameter, single screw, Prodex devolatilizing extruder. The compositions are dried prior to molding on an 80 ton Van Dorn injection molding machine with a 3.5 ounce barrel, melt temperature 510° F., a mold temperature of 150° F. and a total cycle time of 31 seconds.

|  | 1 | Comparative 1A | Comparative 1B |
|---|---|---|---|
| Polybutylene terephthalate[1] | 23.9 | 36.9 | — |
| Polyethylene terephthalate[2] | 13.0 | — | 36.9 |
| Barium sulfate (3 microns av. particle size from Sachtleben) | 63.0 | 63.0 | 63.0 |
| Antioxidant[3] | 0.1 | 0.1 | 0.1 |
| Gloss measurement (60°) % | 87 | 36 | 3% |

|   | Comparative 1 | Comparative 1A | Comparative 1B |
|---|---|---|---|
| reflectance |   |   |   |

[1] IV 0.78 dl/g at 25° C. in 60:40 mixture of phenol-tetrachloroethane
[2] IV 0.55 dl/g at 25° C. in 60:40 mixture of phenol-tetrachloroethane
[3] Irganox 1010: tetrakis(methylene-3(3'5'-di-tert butyl-4-hydroxyphenyl)propionate)methane These test results show that the addition of polyethylene terephthalate to a polybutylene terephthalate-barium sulfate composition improves the gloss.

The composition had the following physical properties:

|   | 1 | Comparative 1A | Comparative 1B |
|---|---|---|---|
| Melt viscosity @ 510° F.; Poise | 5037 | 3283 | 4993 |
| Izod Impact, Notched; Ft. Lbs./In. | .4 | .4 | .4 |
| Izod Impact, unnotched; Ft. Lbs./In. | 4.7 | 4.3 | 5.1 |
| Tensile Elongation; % | 2.5 | 5.0 | 1.5 |
| Tensile Strength; psi | 7188 | 4918 | 8822 |
| Flexural Strength; psi | 14600 | 13490 | 15900 |
| Flexural Modulus; psi | 933400 | 891700 | 822100 |
| Specific Gravity | 2.35 | 2.32 | 2.34 |
| Warp: (before/after) annealing 1 hour @ 250° F.; mm | 0/0 | 0/0 | 0/9.3 |

EXAMPLE 2

The following compositions were prepared using the general procedure of Example 1:

|   | 2 | 2A |
|---|---|---|
| Polybutylene terephthalate | 23.9 | 24.0 |
| Polyethylene terephthalate | 13.0 | 12.4 |
| Barium sulfate (8 microns av. particle size from Pfizer). | 63.0 | 63.0 |
| Antioxidant (Irganox 1010) | 0.1 | 0.1 |
| External lubricant (pentaerythritol tetrastearate) | — | 0.5 |

These compositions have the following physical properties:

|   | 2 | 2A |
|---|---|---|
| Melt Viscosity @ 510° F.; Poise | 4102 | 2514 |
| Heat Distortion @ 264 psi; °F. | 290 | 295 |
| Izod Impact, Unnotched; Ft. Lbs./In. | 3.9 | 3.1 |
| Tensile Strength; psi | 7550 | 6460 |
| Flexural Strength; psi | 13940 | — |
| Flexural Modulus; psi | 829900 | — |
| Specific Gravity | 2.32 | 2.32 |

EXAMPLE 3

This Example compares the physical properties of compositions which contain barium sulfate and polyethylene terephthalate or polybutylene terephthalate alone or in combination.

The samples were molded at 510° F. (barrel) and 150° F. mold temperature. The physical data show that the addition of polyethylene terephthalate and pentaerythritol tetrastearate to the polybutylene terephthalate-barium sulfate composition, increases the unnotched impact strength.

|   | 3 | 3A | 3B | COMPARATIVE C | COMPARATIVE D |
|---|---|---|---|---|---|
| Polybutylene terephthalate | 23.6 | 23.9 | 23.6 | 36.4 | — |
| Polyethylene terephthalate | 12.8 | 13.0 | 12.8 | — | 36.4 |
| Barium sulfate (3 microns av. particle size) | 63.0 | — | — | — | — |
| Barium sulfate (8 microns av. particle size) | — | 63.0 | 63.0 | 63.0 | 63.0 |
| Pentaerythritol tetrastearate | 0.5 | — | 0.5 | 0.5 | 0.5 |
| Antioxidant (Irganox 1010) | 0.1 | 0.1 | 0.1 | 0.1 | 0.1 |
| Melt Viscosity @ 510° F.; Poise | 4633 | 4206 | 4655 | 3126 | 6545 |
| Izod Impact, Notched; Ft. Lbs/in. | .4 | .5 | .4 | .5 | .5 |
| Izod Impact, Unnotched; Ft. Lbs/in. | 5.2 | 4.1 | 4.6 | 3.4 | 4.1 |
| Tensile Elongation; % | 2.3 | 3.4 | 3.8 | 2.7 | 4.1 |
| Tensile Strength; psi | 6770 | 8200 | 7210 | 6960 | 7710 |
| Flexural Strength; psi | 15350 | 13150 | 13110 | 13010 | 13470 |
| Flexural Modulus; psi | 969200 | 808000 | 760900 | 893700 | 879000 |
| Specific Gravity | 2.33 | 2.36 | 2.36 | 2.36 | 2.41 |

Other modifications and variations of the present invention are possible in the light of the above teachings. It is, therefore, to be understood that changes may be made in the particular embodiments of this invention described which are within the full intended scope of the invention as defined by the appended claims.

We claim:

1. A molding composition consisting essentially of:
   (a) 15-30% by total weight of said composition of polybutylene terephthalate resin;
   (b) polyethylene terephthalate resin; and
   (c) from 50-75% by total weight of said molding composition of barium sulfate.

2. A molding composition which comprises:
   (a) 15-30% by total weight of said composition of polybutylene terephthalate resin;
   (b) polyethylene terephthalate resin; and
   (c) from 62-70% by total weight of said molding composition of barium sulfate.

3. A molding composition which consists essentially of:
   (a) from 15-30% by total weight of composition polybutylene terephthalate;

(b) from 8-25% by total weight of composition of polyethylene terephthalate;

(c) from 0.01-5% by weight of composition of an external lubricant;

(d) from 0.01-0.5% by total weight of composition of a phenolic antioxidant; and (e) from 62-70% by weight of barium sulfate.

4. A molding composition as defined in claim 3, wherein the external lubricant is pentaerythritol tetrastearate.

5. A molding composition as defined in claim 3, wherein the antioxidant is tetrakis(methylene-3(3', 5'-di-tert-butyl-4-hydroxyphenyl)propionate)methane.

6. A molding composition as defined in claim 3, which includes a flame retardant amount of a flame retardant.

7. An article which is molded from the composition of claim 3.

8. A thermoplastic molding composition having ceramic like properties which consists essentially of:
   (a) polybutylene terephthalate resin;
   (b) polyethylene terephthalate; and
   (c) from 62-70% by total weight of said molding composition of barium sulfate.

9. A thermoplastic molding composition as defined in claim 8 which has from 15-30% by total weight of composition of polybutylene terephthalate and from 8-25% by total weight of composition of polyethylene terephalate.

* * * * *